United States Patent [19]
Angermann

[11] Patent Number: 5,628,388
[45] Date of Patent: May 13, 1997

[54] HYDRAULIC SHOCK ABSORBER OR SPRING LEG FOR MOTOR VEHICLES

[75] Inventor: Rolf Angermann, Ennepetal, Germany

[73] Assignee: Fried. Krupp AG Hoesch-Krupp, Essen, Germany

[21] Appl. No.: 500,696

[22] Filed: Jul. 11, 1995

[51] Int. Cl.⁶ .................................................. F16F 9/54
[52] U.S. Cl. ...................... 188/321.11; 188/322.19; 267/220; 267/293; 267/294
[58] Field of Search .................. 188/321.11, 322.17, 188/322.19; 267/220, 219, 221, 292, 293, 294, 33, 34, 35, 141.1; 280/668

[56] References Cited

U.S. PATENT DOCUMENTS

| | | | |
|---|---|---|---|
| 4,810,003 | 3/1989 | Pinch et al. | 188/321.11 |
| 5,248,134 | 9/1993 | Ferguson et al. | 188/321.11 |
| 5,261,650 | 11/1993 | Hein | 280/668 |

FOREIGN PATENT DOCUMENTS

| | | |
|---|---|---|
| 3741465 | 7/1988 | Germany . |
| 3823238 | 2/1989 | Germany . |
| 4010858 | 10/1991 | Germany . |

*Primary Examiner*—Douglas C. Butler
*Attorney, Agent, or Firm*—Max Fogiel

[57] ABSTRACT

A hydraulic dashpot or shock absorber for motor vehicles. It comprises a cylinder and a piston. The cylinder contains fluid. The piston travels back and forth inside the cylinder on the end of a piston rod. The rod extends through a package of gaskets that maintains it aligned and seals the cylinder. The rod is attached to the vehicle body or wheel assembly by a projecting-bolt joint. The joint (5) includes resiliently yielding components that suppress impact and vibration by way of an automatic snap-together attachment to the vehicle body or wheel assembly. The projecting-bolt joint (5) is provided with at least one spring (6). The spring snaps into a matching (bent) rigid part of the vehicle body or wheel assembly. Spacers are associated with the resiliently yielding components that suppress impact and vibration. The spacers restrict their deformation once they have been installed.

21 Claims, 6 Drawing Sheets

HYDRAULIC SHOCK ABSORBER OR SPRING LEG FOR MOTOR VEHICLES

BACKGROUND OF THE INVENTION

The present invention concerns a hydraulic dashpot or shock absorber for motor vehicles. It comprises a cylinder and a piston. The cylinder contains fluid. The piston travels back and forth inside the cylinder on the end of a piston rod. The rod extends through a package of gaskets that maintains it aligned and seals the cylinder. The rod is attached to the vehicle body or wheel assembly by a projecting-bolt joint. The joint (5) includes resiliently yielding components that suppress impact and vibration by way of an automatic snap-together attachment to the vehicle body or wheel assembly.

A telescoping dashpot and a shock absorber with a projecting-bolt suspension is known from German OS 3 741 465 A1. The joint comprises a threaded bolt, a flat support, a rubber component, and a cylindrical spacer. The support rests against the joint and against the cylinder or piston rod. The rubber component is in one or two parts and rests against the support. The spacer and bolt extend through the rubber component and rest against the support. The rubber component is tensioned by a retaining or tensioned by a washer and nut. The point of articulation to the body of wheel assembly in this embodiment is between the two halves of the rubber component. Before the dashpot can be installed in the vehicle, accordingly, the nut must be removed, the joint taken apart, and the dashpot introduced into the vehicle and reassembled.

A forward-axle shock absorber with a different genus of projecting-bolt suspension is known from German Patent 4 010 858. The suspension rests on a resilient bearing that the vehicle body or superstructure can be attached to. A helical spring around the shock absorber rests against a cup-shaped spring on the bearing. The bearing itself rests directly against an annular bearing and cylindrical spacer on the piston rod. A rubber and metal ball-and-socket joint surrounds the piston rod, extends into the cup-shaped spring, and is forced against its bottom. The ball-and-socket joint includes a bearing pot that projects out of the cup-shaped spring and is flanged to the vehicle's superstructure and body.

German Patent 3 823 238 describes a resilient bearing that supports a shock absorber with a dashpot. The rubber-to-metal interface is surrounded by a cylindrical holder. The holder includes an exterior flange that can be screwed to the vehicle body.

Common to all these embodiments, however, is the drawback that they are relatively complicated to assemble and must be installed in a manufacturing procedure comprising several operations. German 3 302 057 discloses a resilient bearing for a shock absorber with two resilient components, one of which can be knobbed, meaning snapped, into a bearing block through a constriction in an associated hole in the body during assembly.

This approach, however, also has a drawback. The consistency and resilience of the rubber must essentially be adjusted to the knobbing requirements. The result is a not always satisfactory compromise in relation to how much vibration and impact can be suppressed.

SUMMARY OF THE INVENTION

The object of the present invention is accordingly a dashpot or shock absorber with a projecting-bolt suspension that can be attached by a simple procedure to the body and/or wheel assembly of a vehicle without disassembling the suspension and without extra screws and that will suppress vibration and impact during operation as well as conventional embodiments. The projecting-bolt joint (5) is accordingly provided in accordance with the present invention with at least one spring (6). The spring snaps into a matching (bent) rigid part of the vehicle body or wheel assembly. Spacers are associated with the resiliently yielding components that suppress impact and vibration. The spacers restrict their deformation once they have been installed.

The spring in one advantageous embodiment of the present invention is a resilient disk with recesses and with its edge bent into a rim. When the joint is employed with two rubber components compressed together axially, the disk is interposed between them. When the joint is employed with a single compressed rubber component with at least two beads around it, the disk is interposed between the beads. When the joint is supported on a resilient bearing with a rubber-to-metal interface, either the metal half of the interface or a connecting flange acts as a spring.

To ensure solid seating of the spring in the matching part of the vehicle body or wheel assembly, the angle of the rim around the spring is greater [sic!] than the angle of the matching rigid part of the vehicle body or wheel assembly.

The projecting-bolt joint is attached to the vehicle in another embodiment of the present invention in that the half of the attachment on the vehicle body or wheel assembly is a spring that snaps into a matching rigid part of the joint.

The particular advantage of the present invention is that the projecting-bolt joint does not need to be taken apart while the dashpot is being installed in the vehicle. The additional screwing can also be eliminated. When service is needed, the dashpot can be removed by loosening the screws in the matching rigid part or shock absorber, leaving the spring attached to the vehicle body or wheel assembly.

BRIEF DESCRIPTION OF THE DRAWINGS

Embodiments of the present invention will now be specified with reference to the accompanying drawing, wherein.

DESCRIPTION OF THE PREFERRED EMBODIMENTS

Figure 1:
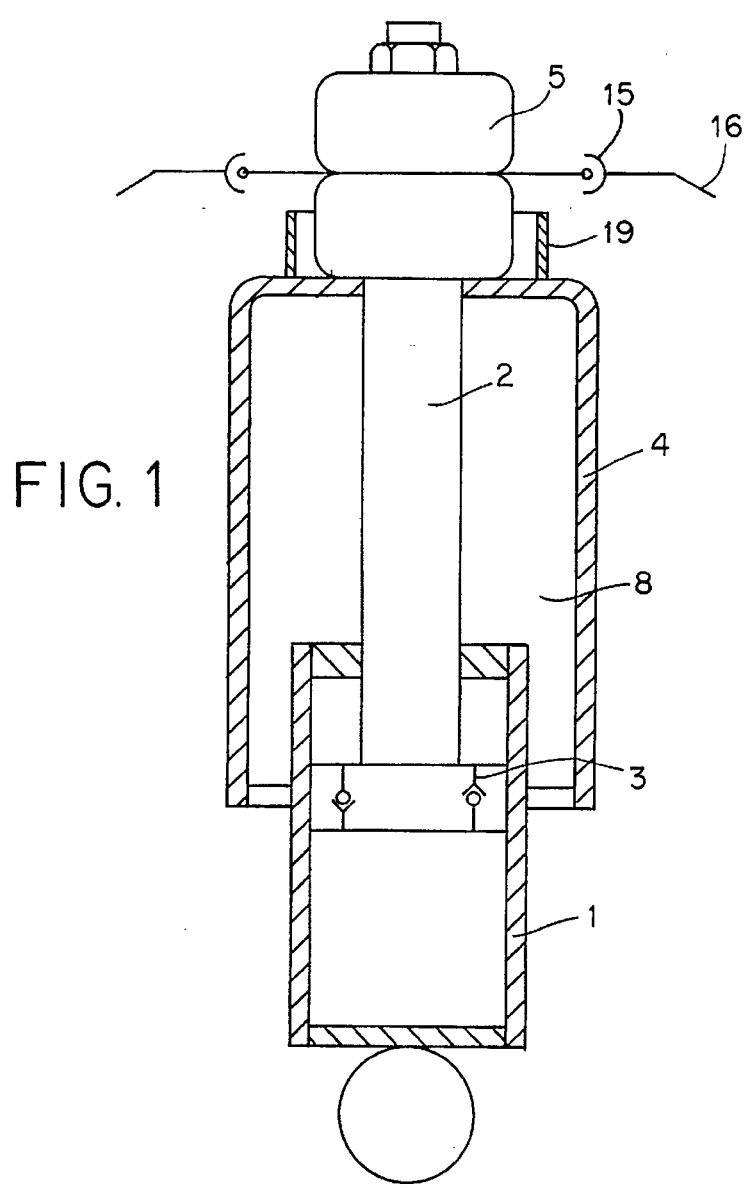
FIG. 1 illustrates the principle behind a dashpot with a projecting-bolt suspension in accordance with the present invention.

The single-cylinder hydraulic dashpot illustrated in FIG. 1 essentially comprises a cylinder 1 and a piston 3. Piston 3 travels back and forth inside the cylinder on the end of a rod 2. Rod 2 extends through a package 8 of gaskets that maintains it aligned and seals the cylinder. The rod is protected by a cap 4.

The dashpot is attached to the body of a vehicle by a projecting-bolt joint 5 for a suspended dashpot whereby the angular motion is the same in all planes. Projecting-bolt joint 5 comprises two rubber components 9 and 10 tensioned by several domed washers 17 and 18 and secured by a nut 20.

A pot-shaped disk 19 is employed as a spacer associated with the resiliently yielding rubber components, limiting how far the components will yield in operation. The components will accordingly yield to the considerable forces they are subjected to during installation only until pot-shaped disk 19 comes to rest against prescribed limits. This approach reliably protects the rubber components from damage and they can be dimensioned in terms of their operating state alone.

To ensure enough space between washer 17 and a protective cap accommodation 34, projecting-bolt joint 5 has a spacer 22 that extends through rubber components 9 and 10 along with the threaded projecting bolt 21. A snap-together attachment 15 comprises a spring 6 with its edge bent into a rim. It has recesses symmetrically distributed around it to establish resilience. When the dashpot is installed in a vehicle, the resilient parts 23 of the spring snap into the matching rigid part 16 of the vehicle body or wheel assembly and the spring accordingly becomes part of the body. When service is needed, when, that is, the dashpot needs to be replaced, it can be removed by loosening nut 20 and extracting the projecting-bolt joint.

Figure 3B:
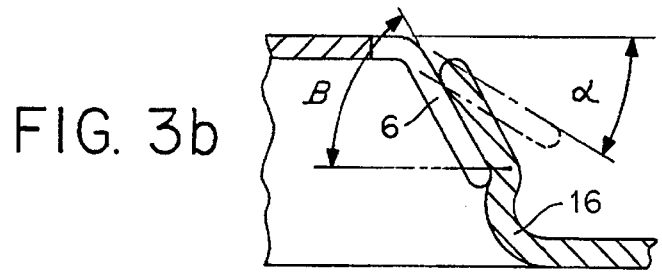
FIG. 3b illustrates the snap-together attachment between the spring and the body of the vehicle.

A solid attachment between spring 6 and the rigid part 16 that will not come apart while the vehicle is in operation will be created when the edge of the spring is bent less than rigid part 16 as illustrated in FIG. 3b.

When projecting-bolt joint 5 is employed with a one piece rubber component 11, spring 6 will be interposed between two beads 12 and 13 and secured by the tension of rubber component 11.

Figure 5:
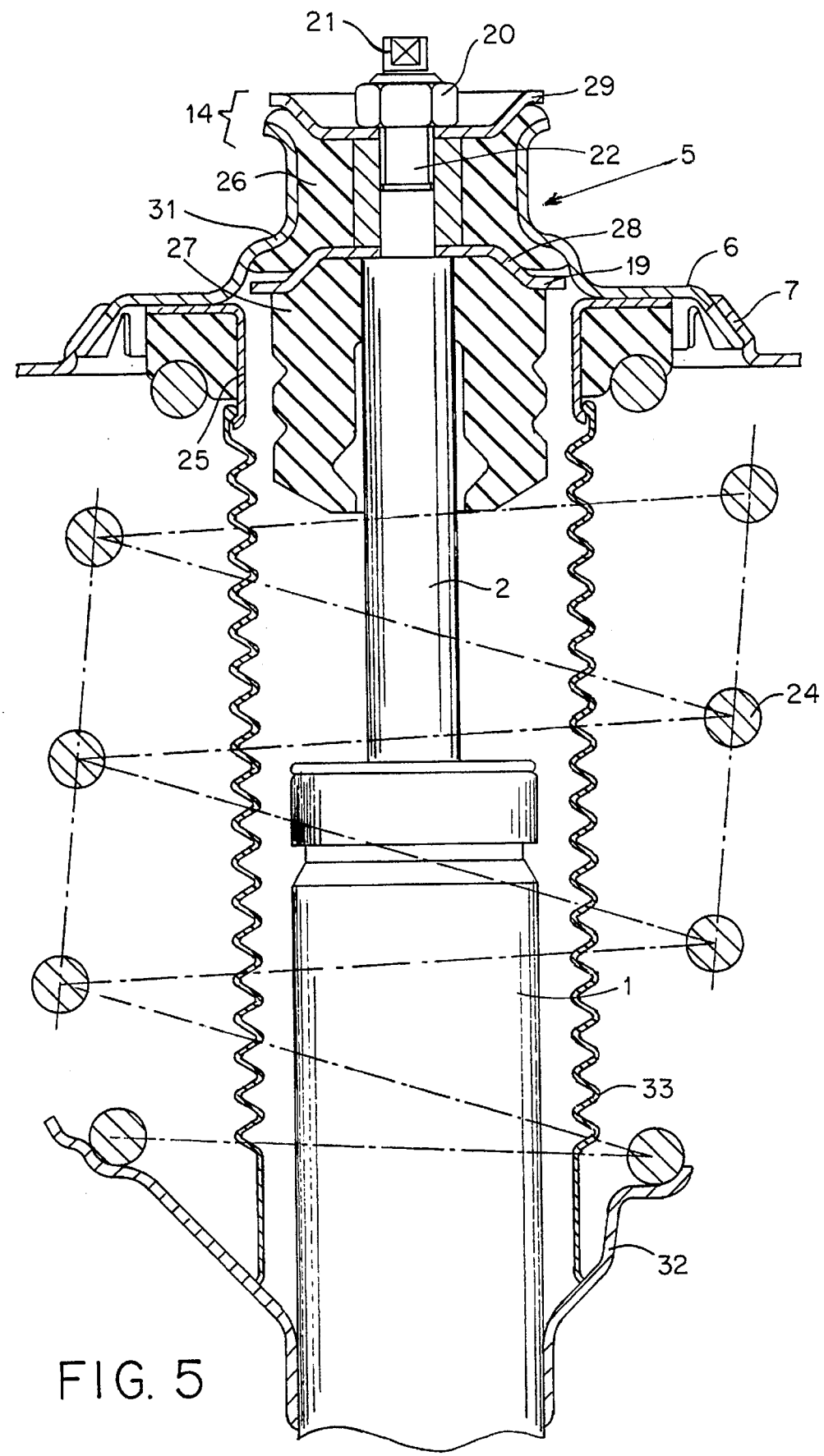
FIG. 5 is a section through a shock absorber intended for an unarticulated rear axle.
Figure 6:
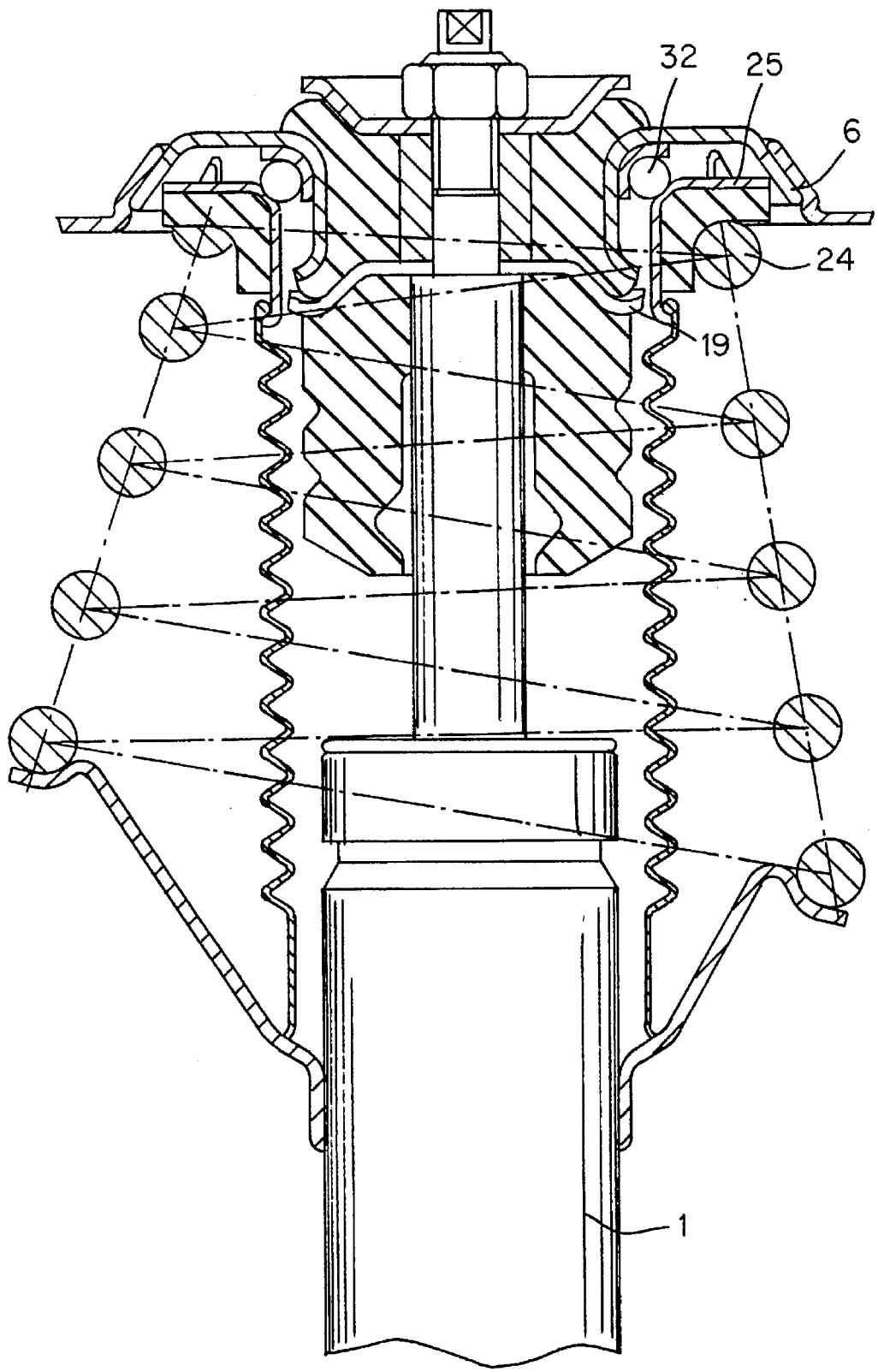
FIG. 6 is a section through a shock absorber intended for an articulated forward axle.

FIG. 5 illustrates a shock absorber for an unarticulated rear axle. Its piston rod 2 is secured to the vehicle body by a projecting-bolt joint 5 supported on a resilient bearing on the body. The shock absorber is enclosed in a helical spring 24 interposed between a resilient disk 32 secured to cylinder 1 and a pot spring 25 connected to a bellows 33. The resilient supporting bearing again comprises a rubber-to-metal interface 14 that surrounds bolt 21 and spacer 22. The rubber half 26 of rubber-to-metal interface 14 is compressed by a conical washer 28 that rests against a buffer 27, and an upper conical washer 29 by nut 20. To connect projecting-bolt joint 5 to the rigid component 7 of the vehicle body, the metal half 31 of rubber-to-metal interface 14 has an intermediate collar in the form of a spring 6. Once the shock absorber has been installed in the dashpot, the whole rubber-to-metal interface 14 in this embodiment becomes a permanent part of the vehicle body. When service is needed, this shock absorber can be removed by releasing nut 20 and taking the projecting-bolt joint apart. The snap-together attachment in accordance with the present invention can, as will be evident from FIG. 6, also be employed for a forward-axle shock absorber. It must, however, be kept in mind that spring 6 does not touch that part of a ball bearing 30 that is connected to the helical spring 24 around cylinder 1 by pot spring 25.

Figure 2:
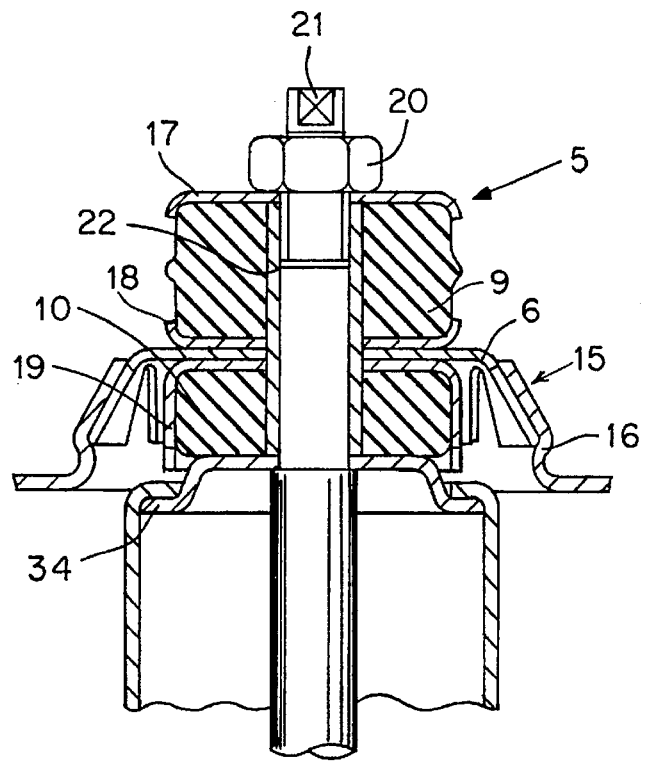
FIG. 2 illustrates a projecting-bolt joint with a two-part rubber component.
Figure 3A:
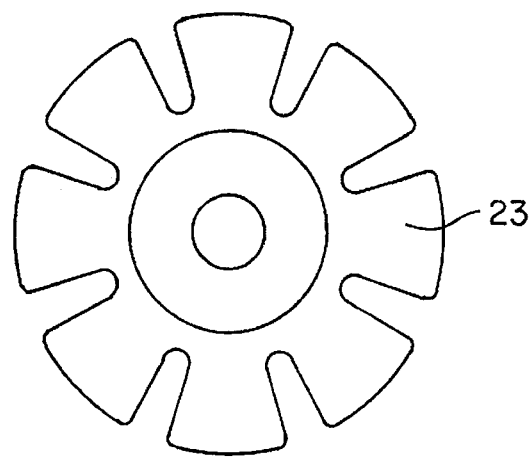
FIG. 3a is a top view of the spring.
Figure 4:
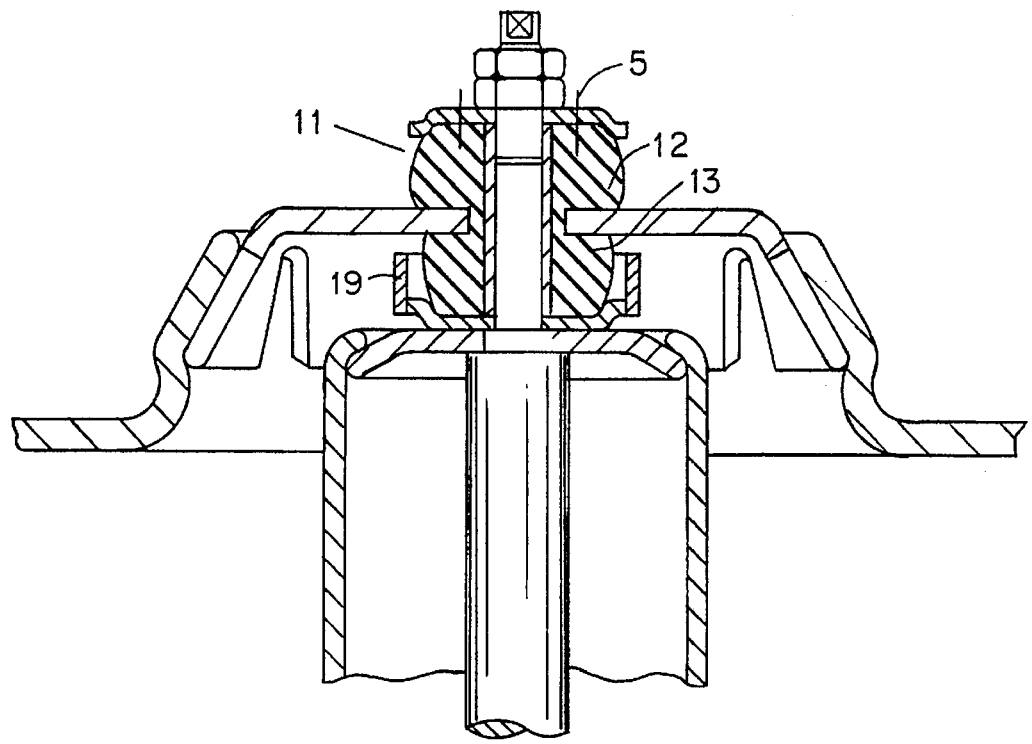
FIG. 4 illustrates a projecting-bolt joint with a one-part rubber component.
Figure 7:
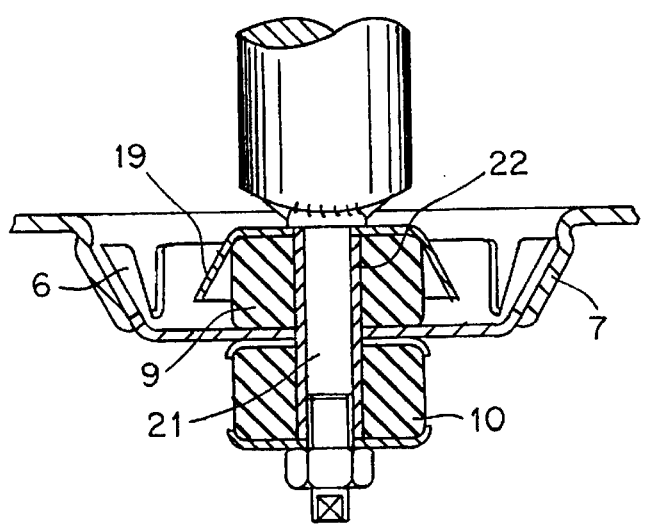
FIG. 7 illustrates a projecting-bolt joint attached to a dashpot cylinder.

FIG. 7 illustrates a projecting-bolt joint 5 for a suspension for a dashpot or shock absorber that is attached to the vehicle wheel assembly at the bottom. Projecting-bolt joint 5 comprises, as will also be evident from FIG. 2, two compressed rubber components 9 and 10 that surround bolt 21 and spacer 22. Spring 6 is interposed between rubber components 9 and 10 and snaps into a matching part of the wheel assembly.

Noise and corrosion can be reduced by providing the contacting surfaces of the spring 6 and the rigid component 7 of the vehicle body or wheel assembly in all embodiments of the snap-together attachment with an anti-noise and/or anti-corrosion coating.

Figure 8:
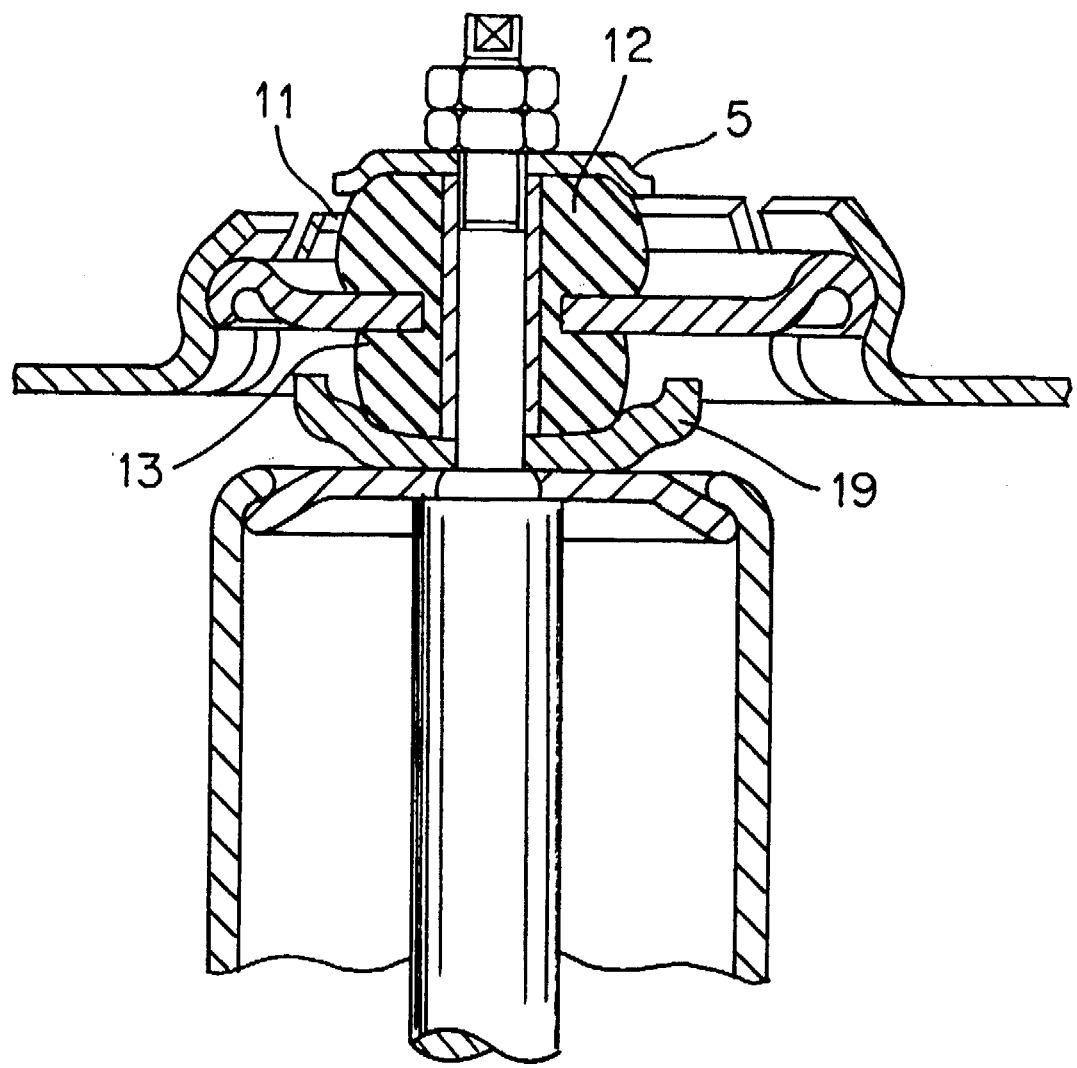
FIG. 8 illustrates a projecting-bolt joint with an alternative sheet-metal spring attached to the dashpot cylinder.

FIG. 8 again illustrates a projecting-bolt joint attached to a cylinder with an alternative sheet-metal spring essentially similar to the spring illustrated in FIG. 1.

I claim:

1. A hydraulic shock absorber for motor vehicles, comprising a cylinder and a piston with a piston rod; said cylinder containing fluid, said piston traveling back and forth inside said cylinder on an end of said piston rod; said piston rod extending through a package of gaskets maintaining said piston rod aligned and sealing said cylinder; a projecting-bolt joint, said piston rod being attached to a vehicle body by said projecting-bolt joint; said joint including an automatic snap-together attachment to said vehicle body and resiliently yielding components suppressing impact and vibration by said automatic snap-together attachment; said joint having at least one spring snapping into a matching rigid part of said vehicle body; spacer means associated with said resiliently yielding components and restricting deformation of said resiliently yielding components after installing said components in place, said spacer means maintaining a distance from abutting surfaces of said spacer means for absorbing shocks and vibrations during operation and preventing premature fatigue of predamaged materials due to loads applied during installation.

2. A shock absorber as defined in claim 1, wherein said spring is a resilient disk with recesses, said spring having an edge bent into a rim.

3. A shock absorber as defined in claim 2, wherein said rim has a first angle around said spring, said first angle being less than an angle of said matching rigid part.

4. A shock absorber as defined in claim 1, wherein said spring and said rigid component have contacting surfaces with an anti-noise coating.

5. A shock absorber as defined in claim 1, wherein said spring and said rigid component have contacting surfaces with an anti-corrosion coating.

6. A shock absorber as defined in claim 1, wherein said resiliently yielding components suppressing impact and vibration comprise two compressed rubber elements one above the other axially, said spring being interposed between said two rubber elements.

7. A shock absorber as defined in claim 1, wherein said resiliently yielding components suppressing impact and vibration comprise a compressed rubber element with two beads one above the other axially, said spring being interposed between said two beads.

8. A shock absorber as defined in claim 1, wherein said resiliently yielding components suppressing impact and vibration comprise a resilient supporting bearing with a rubber-to-metal connection having a metal portion comprising said spring.

9. A shock absorber as defined in claim 1, wherein said resiliently yielding components suppressing impact and vibration comprise a resilient supporting bearing with a rubber-to-metal interface; and an intermediate flange comprising said spring.

10. A shock absorber as defined in claim 1, wherein said spring is included in said vehicle body and snaps into a matching rigid part of said projecting-bolt joint.

11. A hydraulic shock absorber for motor vehicles, comprising a cylinder and a piston with a piston rod; said cylinder containing fluid, said piston traveling back and forth inside said cylinder on an end of said piston rod; said piston rod extending through a package of gaskets maintaining said piston rod aligned and sealing said cylinder; a projecting-bolt joint, said piston rod being attached to a vehicle wheel assembly by said projecting-bolt joint; said joint including an automatic snap-together attachment to said vehicle wheel assembly and resiliently yielding components suppressing impact and vibration by said automatic snap-together attachment; said joint having at least one spring snapping into a matching rigid part of said vehicle wheel assembly; spacer means associated with said resiliently yielding components and restricting deformation of said resiliently yielding components after installing said components in place, said spacer means maintaining a distance from abutting surfaces of said spacer means for absorbing shocks and vibrations during operation and preventing premature fatigue of predamaged materials due to loads applied during installation.

12. A shock absorber as defined in claim 11, wherein said spring is a resilient disk with recesses, said spring having an edge bent into a rim.

13. A shock absorber as defined in claim 12, wherein said rim has a first angle around said spring, said first angle being less than an angle of said matching rigid part.

14. A shock absorber as defined in claim 11, wherein said spring and said rigid component have contacting surfaces with an anti-noise coating.

15. A shock absorber as defined in claim 11, wherein said spring and said rigid component have contacting surfaces with an anti-corrosion coating.

16. A shock absorber as defined in claim 11, wherein said resiliently yielding components suppressing impact and vibration comprise two compressed rubber elements one above the other axially, said spring being interposed between said two rubber elements.

17. A shock absorber as defined in claim 11, wherein said resiliently yielding components suppressing impact and vibration comprise a compressed rubber element with two beads one above the other axially, said spring being interposed between said two beads.

18. A shock absorber as defined in claim 11, wherein said resiliently yielding components suppressing impact and vibration comprise a resilient supporting bearing with a rubber-to-metal interface having a metal half comprising said spring.

19. A shock absorber as defined in claim 11, wherein said resiliently yielding components suppressing impact and vibration comprise a resilient supporting bearing with a rubber-to-metal interface; and an intermediate flange comprising said spring.

20. A shock absorber as defined in claim 11, wherein said spring is included in said vehicle wheel assembly and snaps into a matching rigid part of said projecting-bolt joint.

21. A hydraulic shock absorber for motor vehicles, comprising a cylinder and a piston with a piston rod; said cylinder containing fluid, said piston traveling back and forth inside said cylinder on an end of said piston rod; said piston rod extending through a package of gaskets maintaining said piston rod aligned and sealing said cylinder; a projecting-bolt joint, said piston rod being attached to a vehicle body by said projecting-bolt joint; said joint including an automatic snap-together attachment to said vehicle body and resiliently yielding components suppressing impact and vibration by said automatic snap-together attachment; said joint having at least one spring snapping into a matching rigid part of said vehicle body; spacer means associated with said resiliently yielding components and restricting deformation of said resiliently yielding components after installing said components in place, said spacer means maintaining a distance from abutting surfaces of said spacer means for absorbing shocks and vibrations during operation and preventing premature fatigue of predamaged materials due to loads applied during installation; said spring being a resilient disk with recesses, said spring having an edge bent into a rim; said rim having a first angle around said spring, said first angle being less than an angle of said matching rigid part; said spring and said rigid component having contacting surfaces with an anti-noise coating; said resiliently yielding components suppressing impact and vibration comprising two compressed rubber elements one above the other axially, said spring being interposed between said two rubber elements; said spring being included in said vehicle body and snapping into a matching rigid part of said projecting-bolt joint.

\* \* \* \* \*